(12) United States Patent
Long et al.

(10) Patent No.: US 12,216,261 B2
(45) Date of Patent: Feb. 4, 2025

(54) WIDE-ANGLE LENS, CAMERA MODULE AND VEHICLE CAMERA

(71) Applicant: JIANGXI LIANCHUANG ELECTRONIC CO., LTD., Nanchang (CN)

(72) Inventors: Tao Long, Nanchang (CN); Weijian Chen, Nanchang (CN); Xinyue Zhang, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 808 days.

(21) Appl. No.: 17/343,785

(22) Filed: Jun. 10, 2021

(65) Prior Publication Data
US 2021/0302704 A1 Sep. 30, 2021

Related U.S. Application Data

(63) Continuation-in-part of application No. PCT/CN2020/131877, filed on Nov. 26, 2020.

(30) Foreign Application Priority Data

Dec. 18, 2019 (CN) .......................... 201911310977.2

(51) Int. Cl.
*G02B 13/06* (2006.01)
*B60R 11/04* (2006.01)
(Continued)

(52) U.S. Cl.
CPC .............. *G02B 13/06* (2013.01); *B60R 11/04* (2013.01); *G02B 9/64* (2013.01); *G02B 13/0045* (2013.01); *H04N 23/55* (2023.01)

(58) Field of Classification Search
CPC ...... G02B 13/06; G02B 9/64; G02B 13/0045; G02B 7/028; G02B 13/006; B60R 11/04; H04N 23/55
See application file for complete search history.

(56) References Cited

U.S. PATENT DOCUMENTS

2007/0139793 A1 6/2007 Mayumi
2010/0195216 A1* 8/2010 Miyazaki ....... G02B 15/145523
359/686
(Continued)

FOREIGN PATENT DOCUMENTS

CN 105974561 A 9/2016
CN 106324797 A 1/2017
(Continued)

OTHER PUBLICATIONS

WIPO, Written opinion of the International Search Authority for PCT Application No. PCT/CN2020/131877, Mar. 3, 2021.
(Continued)

*Primary Examiner* — Joseph P Martinez
*Assistant Examiner* — Ray Alexander Dean

(57) ABSTRACT

This disclosure relates to a wide-angle lens, a camera module and a vehicle camera. The wide-angle lens sequentially includes: a first lens, a second lens, a third lens, a fourth lens, a fifth lens, a sixth lens, and a seventh lens. An object side surface of the first lens is convex and an image side surface of the first lens is concave. An object side surface of the second lens is convex and an image side surface of the second lens is concave. The third lens and the sixth lens are bi-concave lenses. The fourth lens, the fifth lens and the seventh lens are bi-convex lenses. The fifth lens and the sixth lens form a cemented body.

18 Claims, 7 Drawing Sheets

(51) Int. Cl.
*G02B 9/64* (2006.01)
*G02B 13/00* (2006.01)
*H04N 23/55* (2023.01)

(56) References Cited

U.S. PATENT DOCUMENTS

2011/0169912 A1* 7/2011 Abe ................. G02B 9/60
359/717
2017/0315343 A1   11/2017 Nagler

FOREIGN PATENT DOCUMENTS

| CN | 107436480 | A |   | 12/2017 |           |
|----|-----------|---|---|---------|-----------|
| CN | 108490589 | A |   |  9/2018 |           |
| CN | 208092317 | U |   | 11/2018 |           |
| CN | 209014803 | U | * |  6/2019 |           |
| CN | 110412718 | A |   | 11/2019 |           |
| CN | 110412727 | A | * | 11/2019 | G02B 13/00 |
| CN | 110412752 | A |   | 11/2019 |           |
| CN | 110989148 | A |   |  4/2020 |           |

OTHER PUBLICATIONS

WIPO, International Search Report for PCT Application No. PCT/CN2020/131877, Mar. 3, 2021.
SIPO, Office Action for CN Application No. 201911310977.2, Apr. 1, 2021.

* cited by examiner

WIDE-ANGLE LENS, CAMERA MODULE AND VEHICLE CAMERA

CROSS REFERENCE TO RELATED APPLICATION

This application is a continuation-in-part of PCT application No. PCT/CN2020/131877 filed on Nov. 26, 2020. The PCT application claims priority to Chinese application No. 201911310977.2 filed on Dec. 18, 2019. The content of the above-mentioned applications is hereby incorporated herein by reference in its entirety for all purposes.

TECHNICAL FIELD

The disclosure relates to the field of optical lens technologies, and more particularly, to a wide-angle lens, a camera module, and a vehicle camera.

BACKGROUND

With the development of science and technology, vehicle lenses, as key components of automatic driving assistance systems, are developing rapidly, and the requirements for these lenses are becoming higher and higher.

With the performance improvement and size reduction of commonly used photosensitive elements such as Charge Coupled Device (CCD) or Complementary Metal-Oxide Semiconductor (CMOS), higher requirements are put forward for the high imaging quality and miniaturization of mating lenses. Vehicle imaging lenses are required to have good thermal stability and wide-angle performance.

Most of the existing vehicle imaging lenses achieve wide-angle performance by adding more lenses, generally more than 9 lenses, which is not conducive to miniaturization and low cost, increases aberration, and leads to poor imaging quality. Moreover, due to the large temperature change in the working environment of the vehicle lens, it is easy to cause the focus shift of the lens.

SUMMARY

An object of the present disclosure is to provide a wide-angle lens including a relatively small number of lenses, so as to solve the above problems.

In a first aspect, the present disclosure provides a wide-angle lens, the wide-angle lens, from an object side to an image side along an optical axis, sequentially includes a first lens, a second lens, a third lens, a fourth lens, a stop, a fifth lens, a sixth lens, a seventh lens, and a filter,
  the first lens has a negative focal power, an object side surface of the first lens is convex, and an image side surface of the first lens is concave;
  the second lens has a negative focal power, an object side surface of the second lens is convex, and the image side surface of the second lens is concave;
  the third lens has a negative focal power, and an object side surface and an image side surface of the third lens are both concave;
  the fourth lens has a positive focal power, and an object side surface and an image side surface of the fourth lens are both convex;
  the fifth lens has a positive focal power, and an object side surface and an image side surface of the fifth lens are both convex;
  the sixth lens has a negative focal power, an object side surface and an image side surface of the sixth lens are both concave, and the fifth lens and the sixth lens form a cemented body;
  the seventh lens has a positive focal power, and an object side surface and an image side surface of the seventh lens are both convex;
  wherein the first lens and the fourth lens are glass spherical lenses, each of the second lens, the third lens, the fifth lens, the sixth lens, and the seventh lens is a plastic aspherical lens, and the optical center of each of the first lens to the seventh lens is on a same straight line.

The beneficial effects of the present disclosure are that: the wide-angle lens just adopts seven pieces of lenses including glass lenses and plastic lenses, the number of lenses is relatively small; and by reasonably controlling the surface shape of each lens and reasonably collocating the material with the focal power, the wide-angle lens can clearly image under a temperature range of $-40°$ C.$\sim+105°$ C. so the wide-angle lens is capable of meeting imaging requirements of wide-angle performance and high imaging quality while controlling low-cost manufacturing.

The wide-angle lens provided according to the present disclosure may also have the following additional technical features.

Further, the wide-angle lens meets the expression:

$$1.55 < h/f < 1.65;$$

where h represents an image height corresponding to half of the maximum field of view of the wide-angle lens, and f represents an effective focal length of the wide-angle lens.

Further, the wide-angle lens meets the expression:

$$0.04/° < D/h/\text{HFOV} < 0.06/°;$$

where HFOV represents half of the maximum field of view of the wide-angle lens, D represents the maximum diameter of the object side surface of the first lens, and h represents an image height corresponding to half of the maximum field of view of the wide-angle lens.

Further, the wide-angle lens meets the expression:

$$0.06/° < \text{TTL}/h/\text{HFOV} < 0.07/°;$$

where TTL represents a total optical length of the wide-angle lens, HFOV represents half of the maximum field of view of the wide-angle lens, and h represents an image height corresponding to half of the maximum field of view of the wide-angle lens.

Further, the wide-angle lens meets the expressions:

$$15 \times 10^{-6}/(° \text{C.*mm}) < [(dN/dT)2 + (dN/dT)3]/(f2+f3) < 20 \times 10^{-6}/(° \text{C.*mm});$$

$$-70 \times 10^{-6}/(° \text{C.*mm}) < [(dN/dT)5 + (dN/dT)6 + (dN/dT)7]/(f5+f6+f7) < -50 \times 10^{-6}/(° \text{C.*mm});$$

where (dN/dT)2 represents a temperature coefficient of refractive index of the second lens at 20° C., (dN/dT)3 represents a temperature coefficient of refractive index of the third lens at 20° C., (dN/dT)5 represents a temperature coefficient of refractive index of the fifth lens at 20° C., (dN/dT)6 represents a temperature coefficient of refractive index of the sixth lens at 20° C., (dN/dT)7 represents a temperature coefficient of refractive index of the seventh lens at 20° C., f2 represents an effective focal length of the second lens, f3 represents an effective focal length of the third lens, f5 represents an effective focal length of the fifth lens, f6 represents an effective focal length of the six lenses, and f7 represents an effective focal length of the seventh lens.

Further, the wide-angle lens meets the expression:

$$0.4 < (T23+T45)/T10 < 0.45;$$

where T23 represents an air spacing between the first lens and the second lens on the optical axis, T45 represents an air spacing between the second lens and the third lens on the optical axis, and T10 represents a distance between the object side surface of the first lens and a surface of the stop.

Further, the wide-angle lens meets the following expression:

$$0.2 < R31/R72 < 0.65;$$

where R31 represents a radius of curvature of the object side surface of the third lens, and R72 represents a radius of curvature of the image side surface of the seventh lens.

Further, the wide-angle lens meets the expressions:

$$1.9 < D5/E5 < 2.15;$$

$$0.47 < D6/E6 < 0.52;$$

where D5 represents a center thickness of the fifth lens, E5 represents an edge thickness of the fifth lens, D6 represents a center thickness of the sixth lens, and E6 represents an edge thickness of the sixth lens.

Further, the wide-angle lens meets the expression:

$$-28 < (V1+V2)(\varphi 1+\varphi 2)+(V3+V4)(\varphi 3+\varphi 4) < -20;$$

where V1 represents a dispersion coefficient of the first lens, V2 represents a dispersion coefficient of the second lens, V3 represents a dispersion coefficient (Abbe Number) of the third lens, V4 represents a dispersion coefficient of the fourth lens, $\varphi 1$ represents a focal power of the first lens, $\varphi 2$ represents a focal power of the second lens, $\varphi 3$ represents a focal power of the third lens, and $\varphi 4$ represents a focal power of the fourth lens.

Further, the wide-angle lens meets the expression:

$$7 < (V5+V6)(\varphi 5+\varphi 6)+(V7)(\varphi 7) < 10;$$

where V5 represents a dispersion coefficient of the fifth lens, V6 represents a dispersion coefficient of the sixth lens, V7 represents a dispersion coefficient of the seventh lens, $\varphi 5$ represents a focal power of the fifth lens, and $\varphi 6$ represents a focal power of the sixth lens, and $\varphi 7$ represents a focal power of the seventh lens.

Further, the wide-angle lens meets the expression:

$$0.5 < \Sigma CT/TTL < 0.6;$$

where $\Sigma CT$ represents a sum of thicknesses of the first lens to the seventh lens on the optical axis, and TTL represents a total optical length of the wide-angle lens.

In a second aspect, the present disclosure provides an imaging device, the imaging device includes the wide-angle lens provided in the first aspect and an imaging element, and the imaging element is configured to convert an optical image formed by the wide-angle lens into electrical signals.

In a third aspect, the disclosure provides a camera module. The camera module includes a barrel, a holder, an image sensor, and the wide-angle lens provided in the first aspect, wherein the wide-angle lens is mounted in the barrel, the image sensor is mounted in the holder, the barrel is movably mounted on the holder, the wide-angle lens is configured to form an optical image, the image sensor is configured to generate image data for the optical image sensed thereby.

In a fourth aspect, the disclosure provides a vehicle camera. The vehicle camera includes a processor, a memory and the camera module provided in the third aspect, wherein the camera module is configured to capture images, the processor is configured to process the captured images, and the memory is configured to store the captured images.

The additional aspects and advantages of the present disclosure will be partly given in the following description, which will become apparent in the following description, or be understood by practicing the present disclosure.

BRIEF DESCRIPTION OF THE DRAWINGS

The above and/or additional aspects and advantages of the present disclosure will be obvious and easy to understand from the description of the embodiments with reference to the following drawings, in which.

DETAILED DESCRIPTION OF PREFERRED EMBODIMENTS

Figure 1:
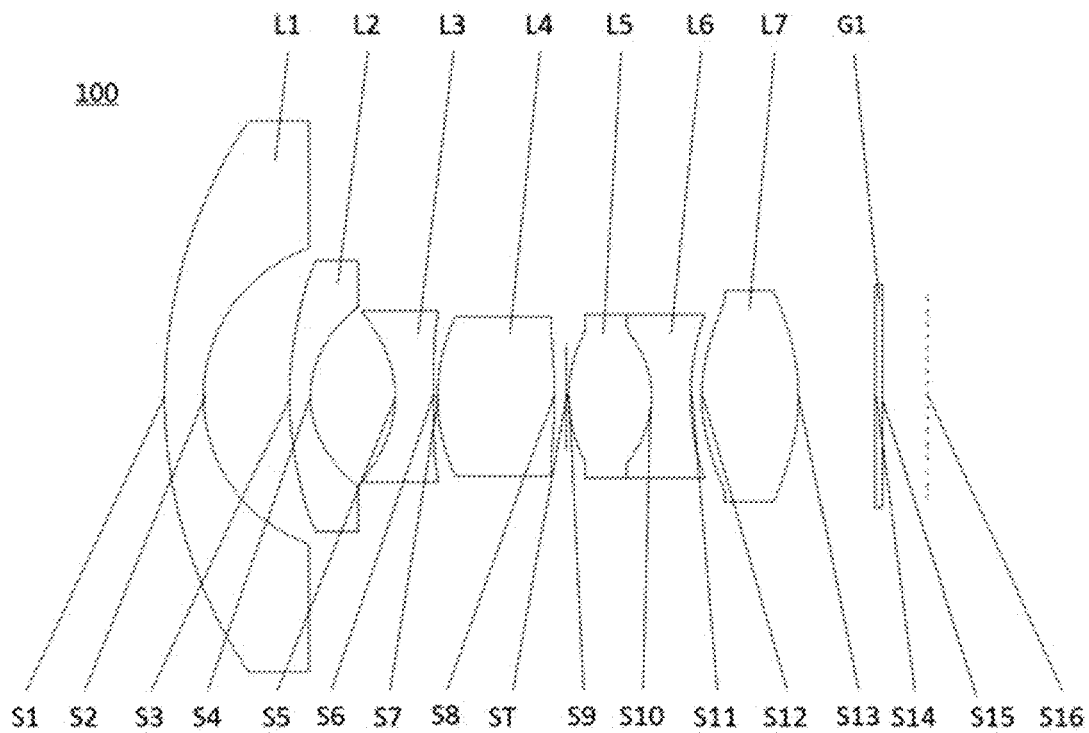
FIG. 1 is a schematic diagram showing the structure of a wide-angle lens according to a first embodiment of the present disclosure.

In order to make the objects, features and advantages of the present disclosure more comprehensible, the specific embodiments of the present disclosure will be described in detail below with reference to the drawings. Several embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

Embodiment 1

FIG. 1 illustrates a structural diagram of a wide-angle lens according to an embodiment of the present disclosure. The wide-angle lens, from an object side to an image side along an optical axis, sequentially includes a first lens L1, a second lens L2, a third lens L3, a fourth lens L4, a stop ST, a fifth lens L5, a sixth lens L6, a seventh lens L7 a filter G1. The wide-angle lens has the following characteristics.

The first lens L1 has a negative focal power, an object side surface S1 of the first lens L1 is convex, and an image side surface S2 of the first lens L1 is concave.

The second lens L2 has a negative focal power, an object side surface S3 of the second lens L2 is convex, and an image side surface S4 of the second lens L2 is concave.

The third lens L3 has a negative focal power, an object side surface S5 and an image side surface S6 of the third lens L3 are both concave.

The fourth lens L4 has a positive focal power, an object side surface S7 and an image side surface S8 of the fourth lens L4 are both convex.

The fifth lens L5 has a positive focal power, an object side surface S9 and an image side surface S10 of the fifth lens L5 are both convex.

The sixth lens L6 has a negative focal power, an object side surface S10 and an image side surface S11 of the sixth lens L6 are both concave, and the fifth lens L5 and the sixth lens L6 form a cemented body.

The seventh lens L7 has a positive focal power, an object side surface S12 and an image side surface S13 of the seventh lens L7 are both convex.

The stop ST is disposed between the fourth lens L4 and the fifth lens L5.

It should be noted that the filter G1 is disposed between the seventh lens L7 and the imaging plane S16, and the filter G1 is configured to selectively filter some lights to optimize the imaging result. In this embodiment, the imaging plane S16 may be a plane where lights incident from the object side and passed through the wide-angle lens are imaged at the image side.

The first lens L1 and the fourth lens L4 are glass spherical lenses, each of the second lens L2, the third lens L3, the fifth lens L5, the sixth lens L6, and the seventh lens L7 is a plastic aspherical lens, and the optical center of each lens is located on the same straight line.

In this embodiment, the wide-angle lens meets the following expression:

$$1.55 < h/f < 1.65; \quad (1)$$

where h represents an image height corresponding to half of the maximum field of view of the wide-angle lens, and f represents the effective focal length of the wide-angle lens. By satisfying the expression (1), the imaging of a relatively large object side space can be realized by a photosensitive element, which is conducive to wide-angle.

Furthermore, the wide-angle lens meets the following expression:

$$0.04/° < D/h/\text{HFOV} < 0.06/°; \quad (2)$$

where HFOV represents half of the maximum field of view of the wide-angle lens, D represents the maximum diameter of the object side surface of the first lens, and h represents an image height corresponding to half of the maximum field of view of the wide-angle lens. By satisfying the expression (2), a front end diameter of the wide-angle lens can be realized to be small.

Further, the wide-angle lens meets the following expression:

$$0.06/° < \text{TTL}/h/\text{HFOV} < 0.07/°; \quad (3)$$

where TTL represents the total optical length of the wide-angle lens, HFOV represents half of the maximum field of view of the wide-angle lens, and h represents an image height corresponding to half of the maximum field of view of the wide-angle lens. By satisfying the expression (3), the miniaturization of the wide-angle lens can be realized, and a shorter total optical length of the wide-angle lens, under the same imaging plane with the same field angle, can be ensured.

Furthermore, the wide-angle lens meets the following expressions:

$$15 \times 10^{-6}/(°\text{C.*mm}) < [(dN/dT)2 + (dN/dT)3]/(f2+f3) < 20 \times 10^{-6}/(°\text{C.*mm}); \quad (4)$$

$$-70 \times 10^{-6}/(°\text{C.*mm}) < [(dN/dT)5 + (dN/dT)6 + (dN/dT)7]/(f5+f6+f7) < -50 \times 10^{-6}/(°\text{C.*mm}); \quad (5)$$

where (dN/dT)2 represents the temperature coefficient of refractive index of the second lens at 20° C., (dN/dT)3 represents the temperature coefficient of refractive index of the third lens at 20° C., (dN/dT)5 represents the temperature coefficient of refractive index of the five lens at 20° C., (dN/dT)6 represents the temperature coefficient of refractive index of the sixth lens at 20° C., (dN/dT)7 represents the temperature coefficient of refractive index of the seventh lens at 20° C., f2 represents the effective focal length of the second lens, f3 represents the effective focal length of the third lens, f5 represents the effective focal length of the fifth lens, f6 represents the effective focal length of the sixth lens, and f7 represents the effective focal length of the seventh lens. By satisfying the expressions (4) and (5), the problem of focus shift caused by a large thermal expansion coefficient of the plastic material is effectively solved, the effect of temperature changes on the focal length is effectively compensated, and the stability of resolution of the wide-angle lens in high and low temperatures is improved, thereby making the wide-angle lens have good thermal stability.

Further, the wide-angle lens meets the following expression:

$$0.4 < (T23+T45)/T10 < 0.45; \quad (6)$$

where T23 represents the air spacing between the first lens and the second lens on the optical axis, T45 represents the air spacing between the second lens and the third lens on the optical axis, and T10 represents the distance between the object side surface of the first lens and a surface of the stop. By satisfying the expression (6), the light deflection angle at the front end of the wide-angle lens can be reasonably distributed, so that the entire system has wide-angle performance.

Further, the wide-angle lens meets the following expression:

$$0.2 < R31/R72 < 0.65; \quad (7)$$

where R31 represents the radius of curvature of the object side surface of the third lens, and R72 represents the radius of curvature of the image side surface of the seventh lens. By satisfying the expression (7), a relationship of the radius of curvature between the third lens and the seventh lens can be reasonably arranged to balance the field curvature and the distortion of the imaging system.

Furthermore, the wide-angle lens meets the following expressions:

$$1.9 < D5/E5 < 2.15; \tag{8}$$

$$0.47 < D6/E6 < 0.52; \tag{9}$$

where D5 represents the center thickness of the fifth lens, E5 represents the edge thickness of the fifth lens, D6 represents the center thickness of the sixth lens, and E6 represents the edge thickness of the sixth lens. By satisfying the expressions (8) and (9), the ratios of center thickness to edge thickness of the fifth lens and the sixth lens are reasonably controlled, it can well reduce the lens processing difficulty and the production cost, and can control the thermal stability of the edge field to be consistent with that of the central field, thereby effectively reducing the focus shift of the imaging system.

Further, the wide-angle lens meets the following expression:

$$-28 < (V1+V2)(\varphi1+\varphi2) + (V3+V4)(\varphi3+\varphi4) < -20; \tag{10}$$

where V1 represents the dispersion coefficient of the first lens, V2 represents the dispersion coefficient of the second lens, V3 represents the dispersion coefficient of the third lens, V4 represents the dispersion coefficient of the fourth lens, $\varphi1$ represents the focal power of the first lens, $\varphi2$ represents the focal power of the second lens, $\varphi3$ represents the focal power of the third lens, and $\varphi4$ represents the focal power of the fourth lens. By satisfying the expression (10), dispersion relation between the lenses can be reasonably distributed and balanced to well correct the chromatic aberration of the system, thereby improving the imaging quality.

Furthermore, the wide-angle lens meets the following expression:

$$7 < (V5+V6)(\varphi5+\varphi6) + (V7)(\varphi7) < 10; \tag{11}$$

where V5 represents the dispersion coefficient of the fifth lens, V6 represents the dispersion coefficient of the sixth lens, V7 represents the dispersion coefficient of the seventh lens, $\varphi5$ represents the focal power of the fifth lens, $\varphi6$ represents the focal power of the sixth lens, and $\varphi7$ represents the focal power of the seventh lens. By satisfying the expression (11), dispersion relation between the lenses can be reasonably distributed and balanced to well correct the chromatic aberration of the system, thereby improving the imaging quality.

Further, the wide-angle lens meets the following expression:

$$0.5 < \Sigma CT/TTL < 0.6; \tag{12}$$

where $\Sigma CT$ represents the sum of the thicknesses of the first lens to the seventh lens on the optical axis, and TTL represents the total optical length of the wide-angle lens. By satisfying the expression (12), the total center thickness of the lenses can be reasonably configured to effectively shorten the total optical length of the wide-angle lens, thereby realizing the miniaturization and wide-angle of the wide-angle lens.

In this embodiment, the surface shape of the aspherical lens satisfies the following equation:

$$z = \frac{ch^2}{1 + \sqrt{1 - (1+K)c^2h^2}} + Bh^4 + Ch^6 + Dh^8 + Eh^{10} + Fh^{12}$$

where z represents the vector height between the point on the aspherical surface and the vertex of the aspherical surface along the optical axis when the aspherical surface is at a height of h; c represents the paraxial curvature of the aspherical surface, $c=1/R$ (that is, the paraxial curvature c is the reciprocal of the radius of curvature); K is the conic coefficient; and B represents the fourth order surface coefficient, C represents the sixth order surface coefficient, D represents the eighth order surface coefficient, E represents the tenth order surface coefficient, and F represents the twelfth order surface coefficient.

Further, in some embodiments, the F number of the wide-angle lens is not greater than 2.2, in this way, good imaging quality in bright and dark environments can be realized, thereby meeting the imaging requirements in relatively dark outdoor environment.

The specific parameter values of each lens of the wide-angle lens in this embodiment are shown in Table 1-1 and Table 1-2. Table 1-1 shows the radius of curvature, the thickness, the refractivity, and the abbe number of each lens included in the wide-angle lens of the first embodiment; and Table 1-2 shows the aspherical coefficients of each aspherical lens included in the wide-angle lens of the first embodiment.

TABLE 1-1

| Surface No. | Surface type | Radius of curvature (mm) | Thickness (mm) | Refractivity | Abbe number | Conic coefficient |
|---|---|---|---|---|---|---|
| OBJ | Spherical surface | — | — | | | |
| S1 | Spherical surface | 12.942 | 1.023 | 1.80 | 46.6 | |
| S2 | Spherical surface | 4.115 | 2.240 | | | |
| S3 | Aspherical surface | 8.134 | 0.555 | 1.54 | 56.0 | 3.071 |
| S4 | Aspherical surface | 2.507 | 2.226 | | | −0.147 |
| S5 | Aspherical surface | −3.041 | 1.007 | 1.52 | 57.0 | −0.848 |
| S6 | Aspherical surface | 29.826 | 0.109 | | | −94.443 |
| S7 | Spherical surface | 4.894 | 3.052 | 1.85 | 30.1 | |
| S8 | Spherical surface | −16.969 | 0.308 | | | |
| ST | Spherical surface | — | 0.064 | | | |
| S9 | Aspherical surface | 3.275 | 2.191 | 1.54 | 56.0 | −2.270 |
| S10 | Aspherical surface | −2.320 | 1.027 | 1.64 | 23.0 | −3.314 |
| S11 | Aspherical surface | 6.562 | 0.282 | | | −22.831 |
| S12 | Aspherical surface | 3.947 | 2.551 | 1.54 | 56.0 | −11.805 |
| S13 | Aspherical surface | −5.247 | 2.000 | | | −8.620 |
| S14 | Spherical surface | — | 0.800 | 1.52 | 64.2 | |

TABLE 1-1-continued

| Surface No. | Surface type | Radius of curvature (mm) | Thickness (mm) | Material Refractivity | Abbe number | Conic coefficient |
|---|---|---|---|---|---|---|
| S15 | Spherical surface | — | 0.566 | | | |
| S16 | Spherical surface | — | — | | | |

TABLE 1-2

| Surface No. | B | C | D | E | F |
|---|---|---|---|---|---|
| S3 | −3.3567E−03 | 2.1134E−04 | −1.1794E−05 | 1.7344E−07 | 0.0000E+00 |
| S4 | −5.1991E−03 | 6.8317E−05 | −4.6970E−05 | −1.1049E−06 | 0.0000E+00 |
| S5 | −6.7625E−03 | 1.1435E−03 | 1.9608E−05 | −7.2423E−06 | 0.0000E+00 |
| S6 | −2.4585E−03 | 9.3255E−04 | 1.0308E−04 | −1.3512E−05 | 0.0000E+00 |
| S9 | 1.3044E−03 | 1.1589E−03 | −6.3917E−04 | 2.3304E−04 | −4.2659E−05 |
| S10 | −1.1265E−02 | −3.7485E−03 | 2.7129E−03 | −1.4161E−03 | 2.9924E−04 |
| S11 | 3.6392E−03 | 2.5294E−03 | −7.8983E−04 | 8.2391E−05 | −5.1603E−07 |
| S12 | 4.4579E−03 | 3.1302E−04 | −1.3111E−04 | 9.4783E−06 | −2.7459E−07 |
| S13 | −5.0794E−03 | 2.9094E−04 | 1.1652E−04 | −1.9354E−05 | 6.7205E−07 |

Figure 2:
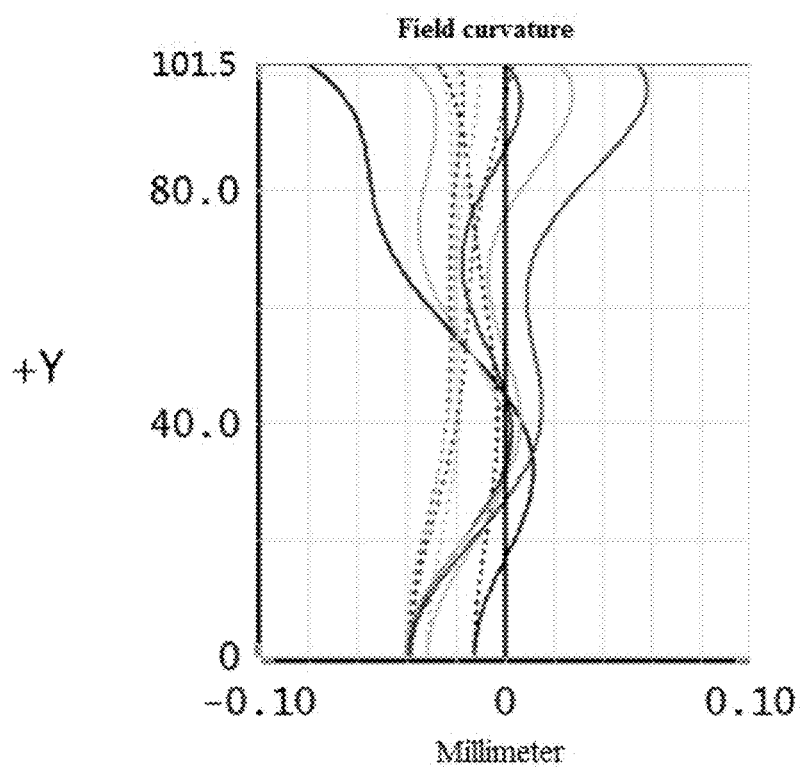
FIG. 2 is a diagram showing field curvature curves of the wide-angle lens according to the first embodiment of the present disclosure, wherein the horizontal axis of this figure represents the shift (in millimeters), and the vertical axis of this figure represents the field angle (in degrees)
Figure 3:
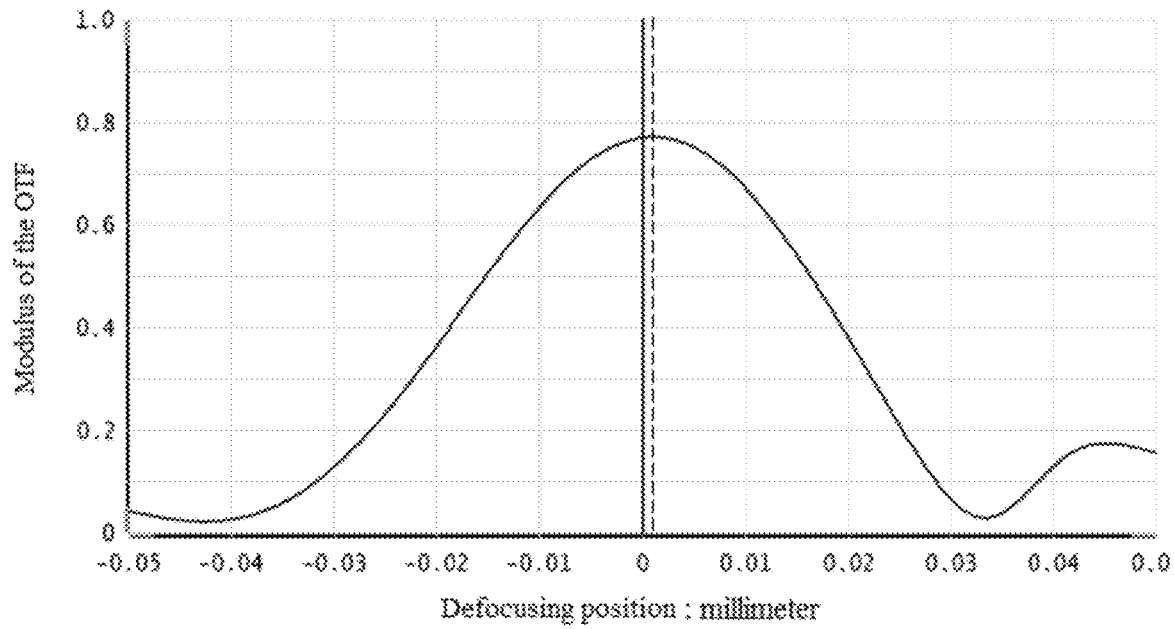
FIG. 3 is a diagram showing a through focus curve of a central field of the wide-angle lens according to the first embodiment of the present disclosure at a low temperature of −40° C., wherein the horizontal axis of this figure represents the defocusing position (in millimeters), and the vertical axis of this figure represents the modulation.
Figure 4:
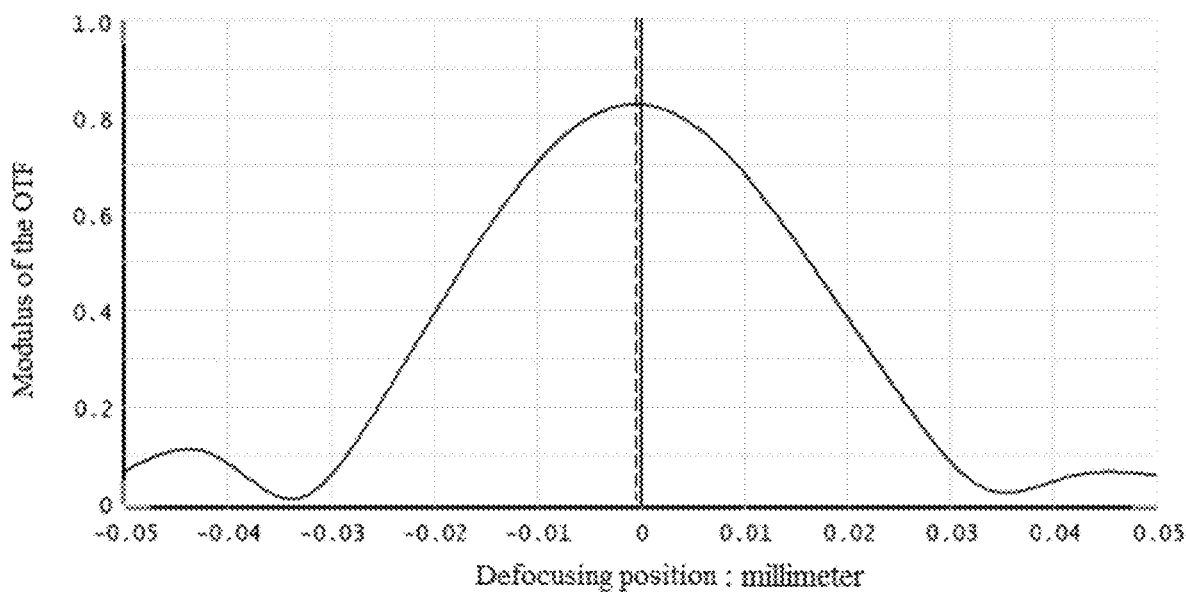
FIG. 4 is a diagram showing a through focus curve of the central field of the wide-angle lens according to the first embodiment of the present disclosure at a high temperature of 105° C.

FIG. 2 illustrates a diagram showing field curvature curves of the wide-angle lens according to the first embodiment. It can be seen from FIG. 2 that the field curvature of the wide-angle lens is within ±0.1 mm, indicating that the field curvature and the astigmatism are well corrected. FIG. 3 illustrates the through focus curve of the central field of the wide-angle lens according to the first embodiment at a low temperature of −40° C., and FIG. 4 illustrates the through focus curve of the central field of the wide-angle lens according to the first embodiment at a high temperature of 105° C. It can be seen from FIG. 3 and FIG. 4 that the difference between the peak positions of the through focus curves in the two figures is less than 5 microns, which indicates the wide-angle lens has good thermal stability.

Embodiment 2

The structure of the wide-angle lens in this embodiment is substantially the same as that in the first embodiment, and the radius of curvature and the material of each lens in the wide-angle lens of this embodiment are different, and specific differences can be seen in Table 2-1 and Table 2-2. Table 2-1 shows the radius of curvature, the thickness, the refractivity, and the abbe number of each lens included in the wide-angle lens of the second embodiment, and Table 2-2 shows the aspherical coefficients of each aspherical lens included in the wide-angle lens of this embodiment.

TABLE 2-1

| Surface No. | Surface type | Radius of curvature (mm) | Thickness (mm) | Material Refractivity | Abbe number | Conic coefficient |
|---|---|---|---|---|---|---|
| OBJ | Spherical surface | — | — | | | |
| S1 | Spherical surface | 13.461 | 1.191 | 1.80 | 46.6 | |
| S2 | Spherical surface | 4.000 | 2.182 | | | |
| S3 | Aspherical surface | 6.520 | 0.580 | 1.54 | 56.0 | 1.767 |
| S4 | Aspherical surface | 2.400 | 2.177 | | | −0.793 |
| S5 | Aspherical surface | −2.788 | 0.970 | 1.52 | 57.0 | −0.616 |
| S6 | Aspherical surface | 78.311 | 0.180 | | | −200.000 |
| S7 | Spherical surface | 4.530 | 3.205 | 1.85 | 30.1 | |
| S8 | Spherical surface | −23.866 | 0.104 | | | |
| ST | Spherical surface | — | 0.073 | | | |
| S9 | Aspherical surface | 3.287 | 2.297 | 1.54 | 56.0 | −4.023 |
| S10 | Aspherical surface | −2.683 | 0.988 | 1.64 | 23.0 | 0.158 |
| S11 | Aspherical surface | 6.315 | 0.350 | | | −36.073 |
| S12 | Aspherical surface | 3.499 | 2.375 | 1.54 | 56.0 | −9.555 |
| S13 | Aspherical surface | −5.972 | 2.000 | | | −12.640 |
| S14 | Spherical surface | — | 0.900 | 1.52 | 64.2 | |
| S15 | Spherical surface | — | 0.344 | | | |
| S16 | Spherical surface | — | — | | | |

TABLE 2-2

| Surface No. | B | C | D | E | F |
|---|---|---|---|---|---|
| S3 | −4.8582E−03 | 2.3509E−04 | −1.1178E−05 | 0.0000E+00 | 0.0000E+00 |
| S4 | −2.3570E−03 | 1.8110E−04 | 4.6300E−05 | 0.0000E+00 | 0.0000E+00 |
| S5 | 2.6687E−03 | 3.4365E−04 | −1.9668E−06 | 0.0000E+00 | 0.0000E+00 |
| S6 | 3.8499E−03 | 3.7354E−04 | 3.5470E−05 | 0.0000E+00 | 0.0000E+00 |
| S9 | 7.3936E−03 | 1.5261E−03 | −1.7150E−03 | 6.3864E−04 | −9.6528E−05 |
| S10 | −3.9108E−02 | 1.3357E−02 | 4.2067E−04 | −1.3015E−03 | 3.0087E−04 |
| S11 | −2.3084E−03 | 2.7471E−03 | −4.0485E−04 | 1.5936E−05 | 1.7073E−06 |
| S12 | 3.3171E−03 | −1.9121E−04 | 1.1985E−05 | −9.4786E−07 | −4.0034E−07 |
| S13 | −2.9417E−03 | 2.9431E−04 | 2.8065E−05 | −7.3642E−06 | 1.1268E−07 |

Figure 5:
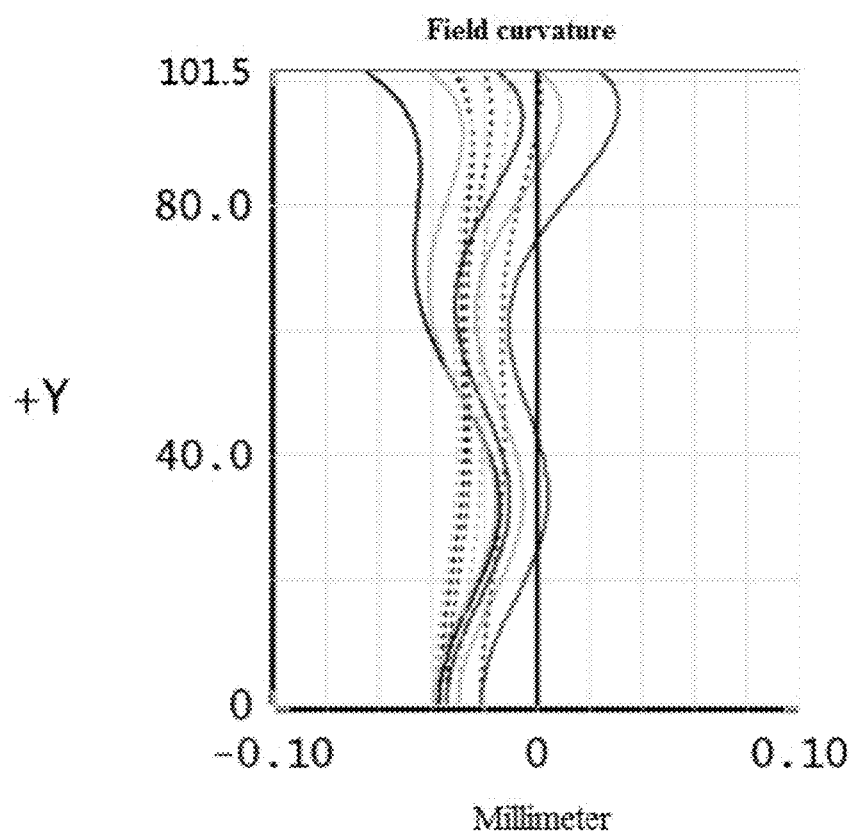
FIG. 5 is a diagram showing field curvature curves of a wide-angle lens according to a second embodiment of the present disclosure.
Figure 6:
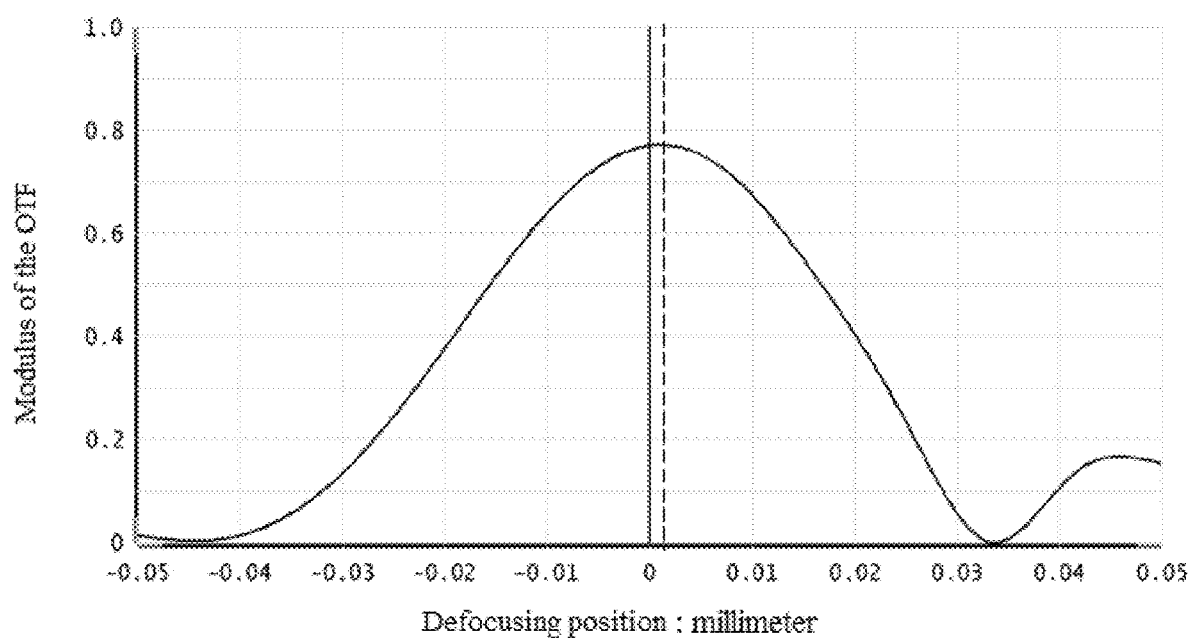
FIG. 6 is a diagram showing a through focus curve of a central field of the wide-angle lens according to the second embodiment of the present disclosure at a low temperature of −40° C.
Figure 7:
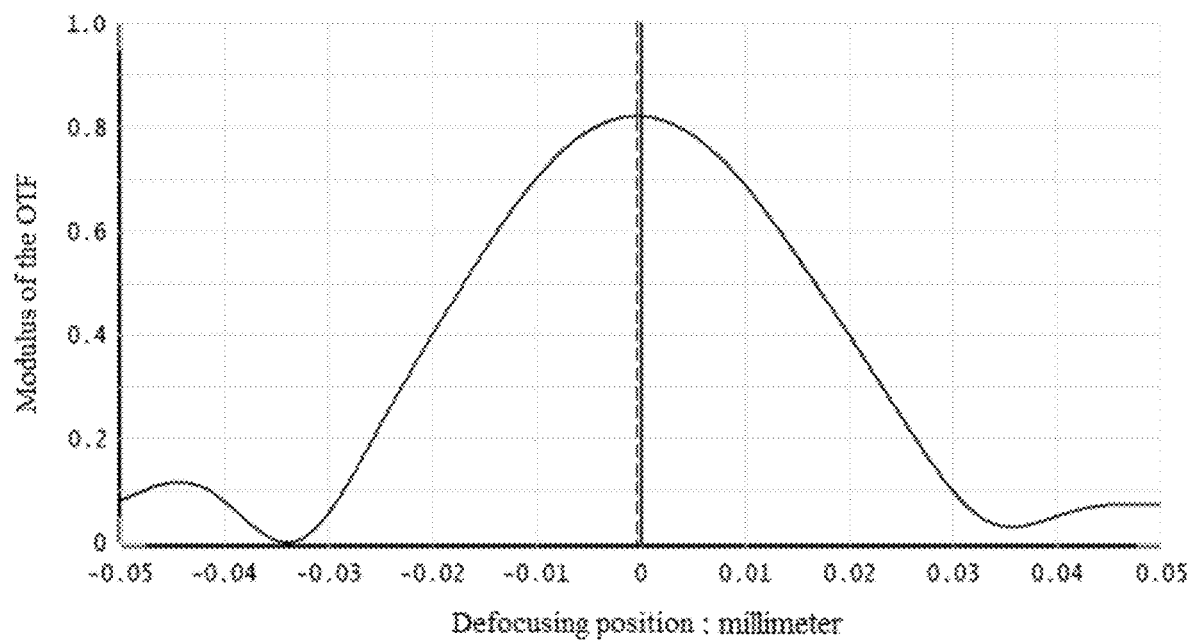
FIG. 7 is a diagram showing a through focus curve of the central field of the wide-angle lens according to the second embodiment of the present disclosure at a high temperature of 105° C.

FIG. 5 illustrates a diagram showing field curvature curves of the wide-angle lens according to the second embodiment. It can be seen from FIG. 5 that the field curvature of the wide-angle lens is within ±0.1 mm, indicating that the field curvature and the astigmatism are well corrected. FIG. 6 illustrates the through focus curve of the central field of the wide-angle lens according to the second embodiment at a low temperature of −40° C. and FIG. 7 illustrates the through focus curve of the central field of the wide-angle lens according to the second embodiment at a high temperature of 105° C. It can be seen from FIG. 6 and FIG. 7 that the difference between the peak positions of the through focus curves in the two figures is less than 5 microns, indicating that the wide-angle lens has good thermal stability.

Embodiment 3

The structure of the wide-angle lens in this embodiment is basically the same as that in the first embodiment, and the difference is that the radius of curvature and material selection of each lens in the wide-angle lens of this embodiment are different, and the specific differences can be seen in Table 3-1 and Table 3-2.

TABLE 3-1

| Surface No. | Surface type | Radius of curvature (mm) | Thickness (mm) | Material Refractivity | Abbe number | Conic coefficient |
|---|---|---|---|---|---|---|
| OBJ | Spherical surface | — | — | | | |
| S1 | Spherical surface | 14.723 | 1.181 | 1.80 | 46.6 | |
| S2 | Spherical surface | 4.154 | 2.335 | | | |
| S3 | Aspherical surface | 6.980 | 0.562 | 1.54 | 56.0 | 1.525 |
| S4 | Aspherical surface | 2.768 | 2.180 | | | −1.066 |
| S5 | Aspherical surface | −3.049 | 1.259 | 1.54 | 56.0 | −0.707 |
| S6 | Aspherical surface | 100.035 | 0.336 | | | −200.001 |
| S7 | Spherical surface | 5.145 | 2.297 | 1.85 | 30.1 | |
| S8 | Spherical surface | −14.677 | 0.772 | | | |
| ST | Spherical surface | — | 0.045 | | | |
| S9 | Aspherical surface | 4.080 | 2.365 | 1.54 | 56.0 | −4.767 |
| S10 | Aspherical surface | −2.099 | 0.994 | 1.64 | 23.0 | −0.358 |
| S11 | Aspherical surface | 10.753 | 0.556 | | | −119.336 |
| S12 | Aspherical surface | 3.305 | 1.925 | 1.54 | 56.0 | −6.552 |
| S13 | Aspherical surface | −12.667 | 2.000 | | | −111.635 |
| S14 | Spherical surface | — | 0.900 | 1.52 | 64.2 | |
| S15 | Spherical surface | — | 0.313 | | | |
| S16 | Spherical surface | — | — | | | |

TABLE 3-2

| Surface No. | B | C | D | E | F |
|---|---|---|---|---|---|
| S3 | −4.9262E−03 | 2.1156E−04 | −6.1225E−06 | 0.0000E+00 | 0.0000E+00 |
| S4 | −3.3362E−03 | −7.6378E−05 | 1.7632E−05 | 0.0000E+00 | 0.0000E+00 |
| S5 | 3.3041E−03 | 3.8346E−04 | −2.1757E−05 | 0.0000E+00 | 0.0000E+00 |
| S6 | 7.1059E−03 | 4.5653E−04 | −4.9175E−06 | 0.0000E+00 | 0.0000E+00 |
| S9 | 5.5869E−03 | 2.2551E−03 | −1.7561E−03 | 6.0095E−04 | −7.7893E−05 |
| S10 | −1.6305E−02 | 9.1390E−03 | −9.6540E−04 | −9.9822E−04 | 2.4350E−04 |
| S11 | −3.8033E−03 | 2.1319E−03 | −3.5105E−04 | 2.0145E−05 | 1.1019E−06 |
| S12 | 2.7640E−03 | −1.9594E−04 | 7.8217E−06 | −3.5814E−07 | −3.3158E−07 |
| S13 | −1.5217E−03 | 2.7700E−04 | 2.0448E−05 | −8.2567E−06 | 2.1292E−07 |

Figure 8:
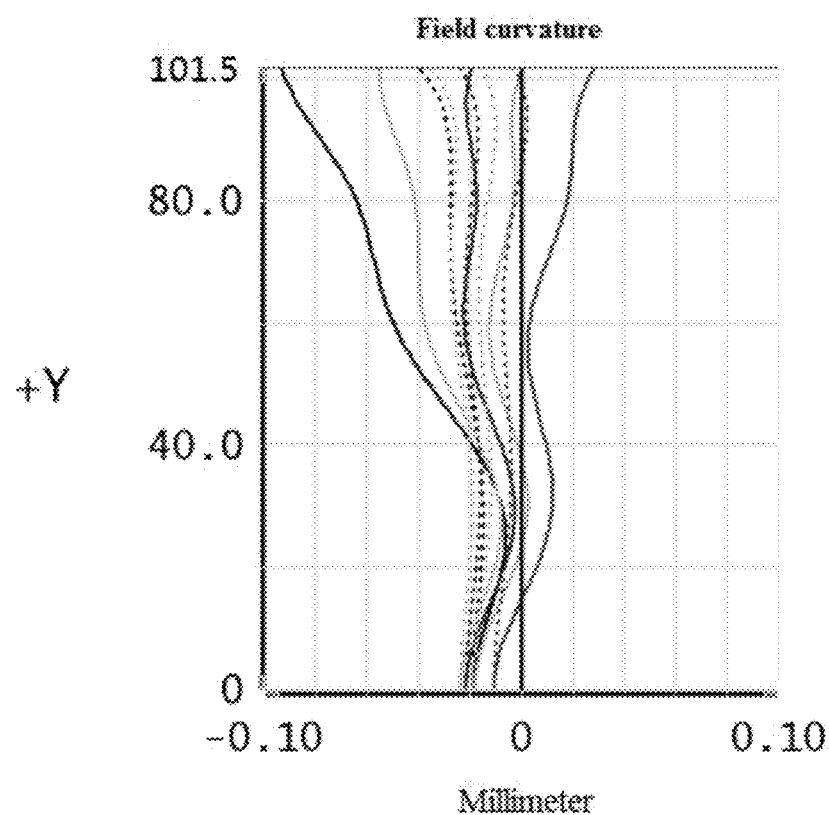
FIG. 8 is a diagram showing field curvature curves of a wide-angle lens according to a third embodiment of the present disclosure.
Figure 9:
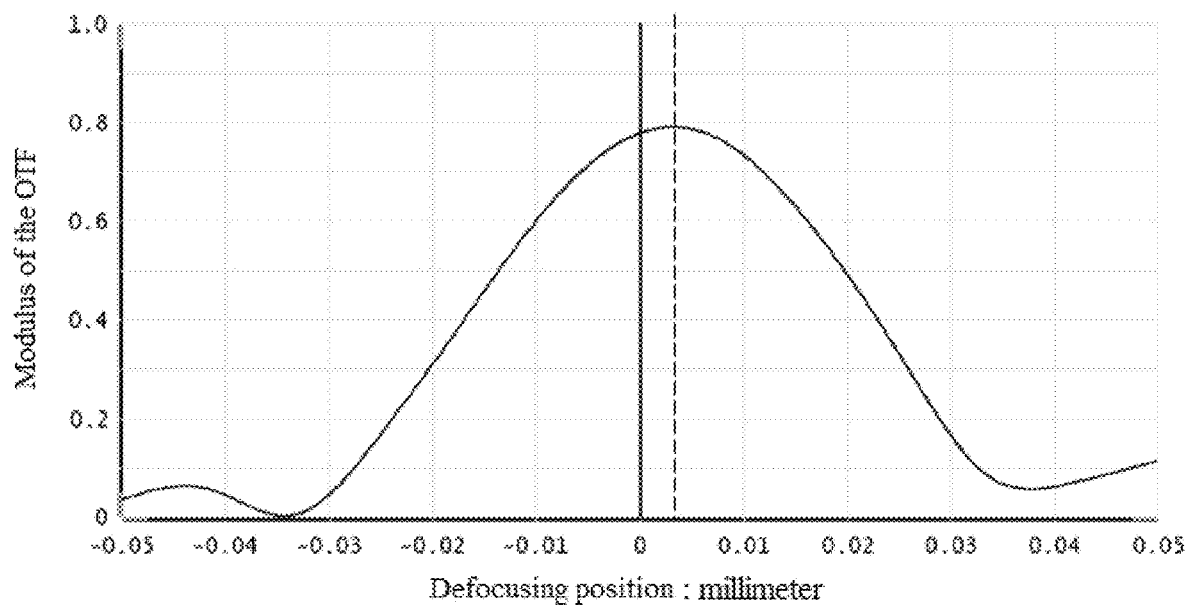
FIG. 9 is a diagram showing a through focus curve of a central field of the wide-angle lens according to the third embodiment of the present disclosure at a low temperature of −40° C.
Figure 10:
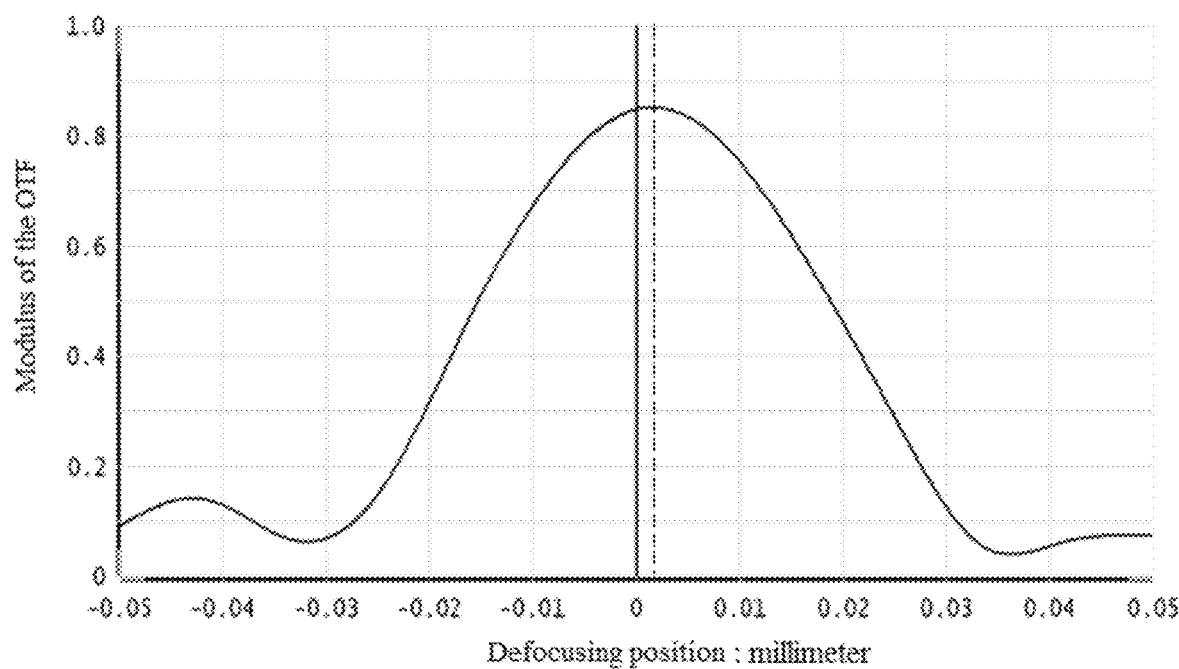
FIG. 10 is a diagram showing a through focus curve of the central field of the wide-angle lens according to the third embodiment of the present disclosure at a high temperature of 105° C.

FIG. 8 illustrates a diagram showing field curvature curves of the wide-angle lens according to the third embodiment. It can be seen from FIG. 8 that the field curvature of the wide-angle lens is within ±0.1 mm, indicating that the field curvature and the astigmatism are well corrected. FIG. 9 illustrates the through focus curve of the central field of the wide-angle lens according to the third embodiment at a low temperature of −40° C., and FIG. 10 illustrates the through focus curve of the central field of the wide-angle lens according to the third embodiment at a high temperature of 105° C. It can be seen from FIG. 9 and FIG. 10 that the difference between the peak positions of the through focus curves in the two figures is less than 5 microns, indicating that the wide-angle lens has good thermal stability.

Table 4 shows the corresponding optical characteristics of the wide-angle lens in above three embodiments, including the effective focal length f, total optical length TTL, half of the maximum field of view HFOV, image height h corresponding to half of the maximum field of view, and F number F/NO of the wide-angle lens, and the values corresponding to each of the aforementioned expressions.

TABLE 4

| Expression | Embodiment 1 | Embodiment 2 | Embodiment 3 |
|---|---|---|---|
| f(mm) | 1.871 | 1.85 | 1.864 |
| TTL(mm) | 20.0017 | 19.9167 | 20.0195 |
| HFOV (°) | 101.5 | 101.5 | 101.5 |
| h(mm) | 2.966 | 2.962 | 2.963 |
| F/NO | 2.01457 | 2.01123 | 2.0085 |
| h/f | 1.585 | 1.601 | 1.59 |
| D/h/HFOV (unit: /°) | 0.0481 | 0.049 | 0.05 |
| TTL/h/HFOV (unit: /°) | 0.0664 | 0.0662 | 0.0666 |
| $[(dN/dT)2 + (dN/dT)3]/(f2 + f3)$ (unit: /° C.*mm) | $16.25 \times 10^{-6}$ | $15.79 \times 10^{-6}$ | $18.51 \times 10^{-6}$ |
| $[(dN/dT)5 + (dN/dT)6 + (dN/dT)7]/(f5 + f6 + f7)$ (unit: /° C.*mm) | $-62.60 \times 10^{-6}$ | $-64.71 \times 10^{-6}$ | $-58.22 \times 10^{-6}$ |
| (T23 + T45)/T10 | 0.425 | 0.412 | 0.416 |
| R31/R72 | 0.580 | 0.467 | 0.241 |
| D5/E5 | 1.985 | 2.005 | 2.005 |
| D6/E6 | 0.496 | 0.485 | 0.494 |
| $(V1 + V2)(\varphi 1 + \varphi 2) + (V3 + V4)(\varphi 3 + \varphi 4)$ | −26.986 | −25.96 | −22.041 |
| $(V5 + V6)(\varphi 5 + \varphi 6) + (V7)(\varphi 7)$ | 9.16 | 9.72 | 8.04 |
| ΣCT/TTL | 0.57 | 0.583 | 0.529 |

The wide-angle lens in the present disclosure adopts seven lenses. By reasonably distributing the focal power, surface shape, and center thickness of each lens, and the on-axis distance between lenses, the wide-angle lens achieves good image quality, and at the same time has at least one beneficial effect such as miniaturization, low sensitivity, and good processability. Secondly, for the wide-angle lens of the present disclosure, the first lens L1 and the fourth lens L4 are both glass lenses, and each of the second lens L2, the third lens L3, the fifth lens L5, the sixth lens L6, and the seventh lens L7 is a plastic aspherical lens. By optimizing the positive and negative refractive index of each lens, the aberration of the wide-angle lens of the present disclosure can be effectively corrected, and at the same time, the defect that the plastic lens is likely to cause focus shift in high and low temperatures due to its large expansion coefficient is overcome. The use of plastic aspherical lenses can effectively correct the aberration of the wide-angle lens and improve the resolution of the entire lens group; in addition, the combined use of glass and plastic materials can effectively reduce the manufacturing cost and improve product competitiveness.

Embodiment 4

Figure 11:
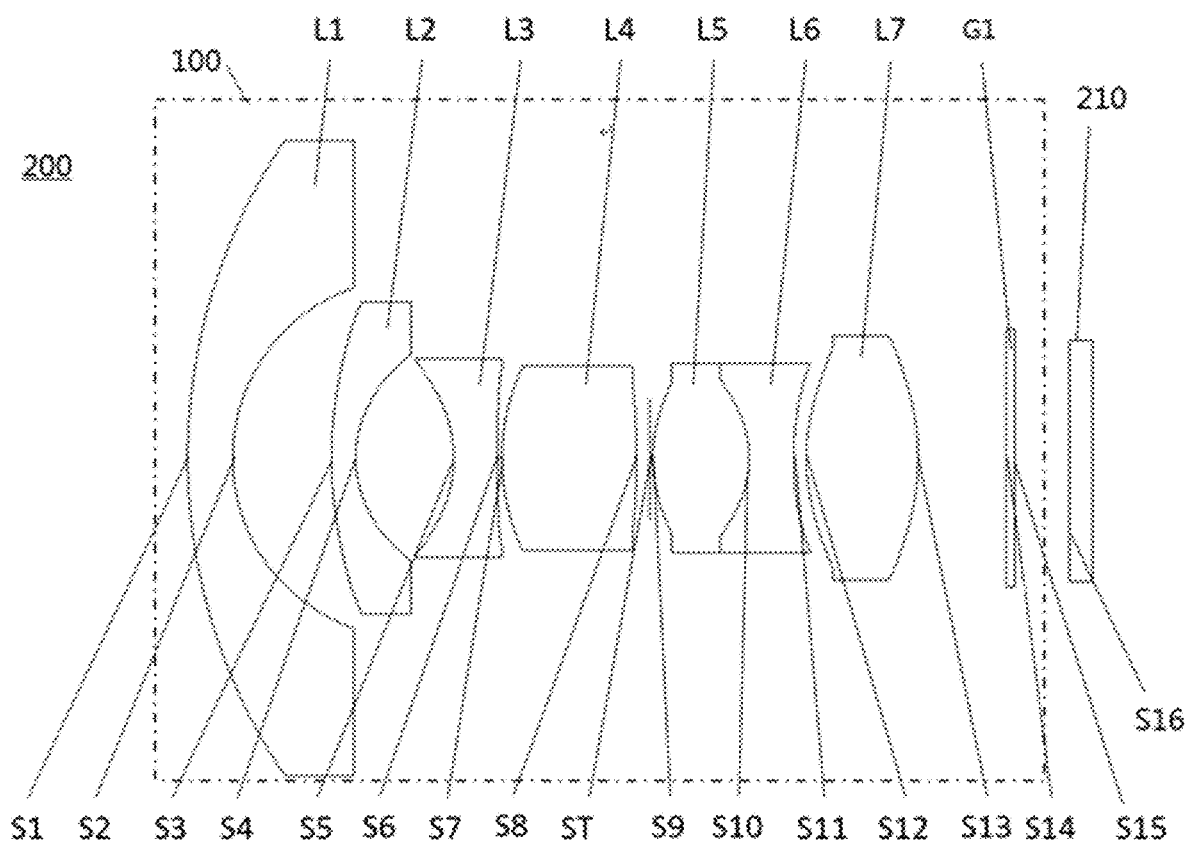
FIG. 11 is a schematic diagram showing the structure of an imaging device according to a fourth embodiment of the present disclosure.

FIG. 11 illustrates a schematic diagram showing the structure of an imaging device 200 according to this embodiment, the imaging device 200 includes the wide-angle lens (for example, the wide-angle lens 100) according to any of the above embodiments and an imaging element 210. The imaging element 210 may be a CMOS (Complementary Metal Oxide Semiconductor) image sensor, or may be a CCD (Charge Coupled Device) image sensor.

The imaging device 200 may be a sports camera, a panoramic camera, a vehicle camera, or any other electronic device loaded with an optical imaging lens.

The imaging device 200 of this embodiment includes a wide-angle lens. Since the wide-angle lens has the advantages of miniaturization, low sensitivity, and good thermal stability, the imaging device 200 has the advantages of miniaturization, low sensitivity, and good thermal stability.

Embodiment 5

Figure 12:
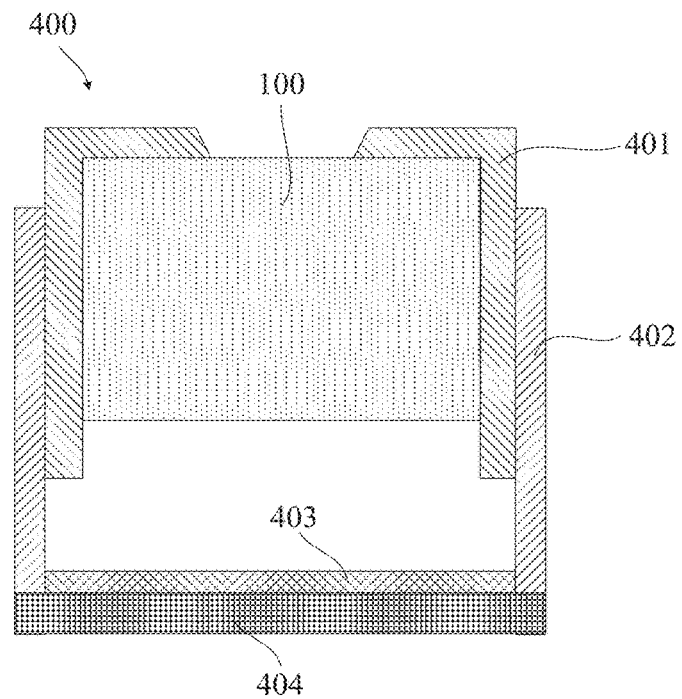
FIG. 12 is a schematic structural diagram showing a cross-section of a camera module according to a fifth embodiment of the disclosure.

FIG. 12 is a schematic diagram showing a cross-section of a camera module 400 provided in this embodiment. The camera module 400 includes a barrel 401, a holder 402, an image sensor 403, a printed circuit board 404, and the wide-angle lens 100 of any one of the foregoing embodiments. FIG. 12 takes the wide-angle lens 100 of the first embodiment as an example. The wide-angle lens 100 is mounted in the barrel 401, the image sensor 403 is mounted in the holder 402, and the barrel 401 is movably mounted on the holder 402. The wide-angle lens 100 is configured to form an optical image. The image sensor 403 is opposite to the wide-angle lens 100 and is configured to generate image data for the optical image sensed thereby. The image sensor 403 may be a CMOS sensor or a CCD sensor.

It is noted that the image sensor 403 may be mounted on the printed circuit board 404, or may be electrically connected with a processing chip, to process the image data.

Embodiment 6

Figure 13:
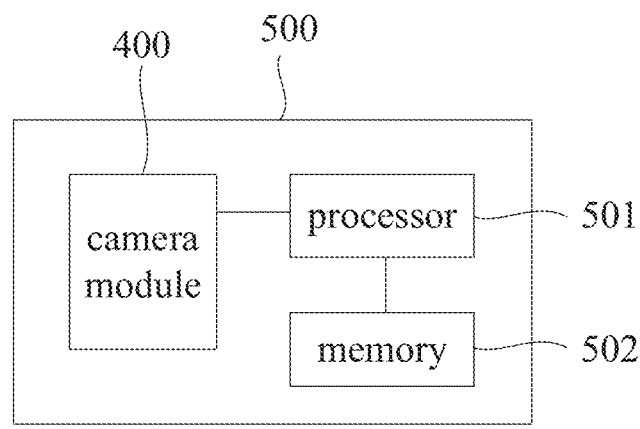
FIG. 13 is a schematic block diagram of a vehicle camera according to a sixth embodiment of the disclosure.
Figure 14:
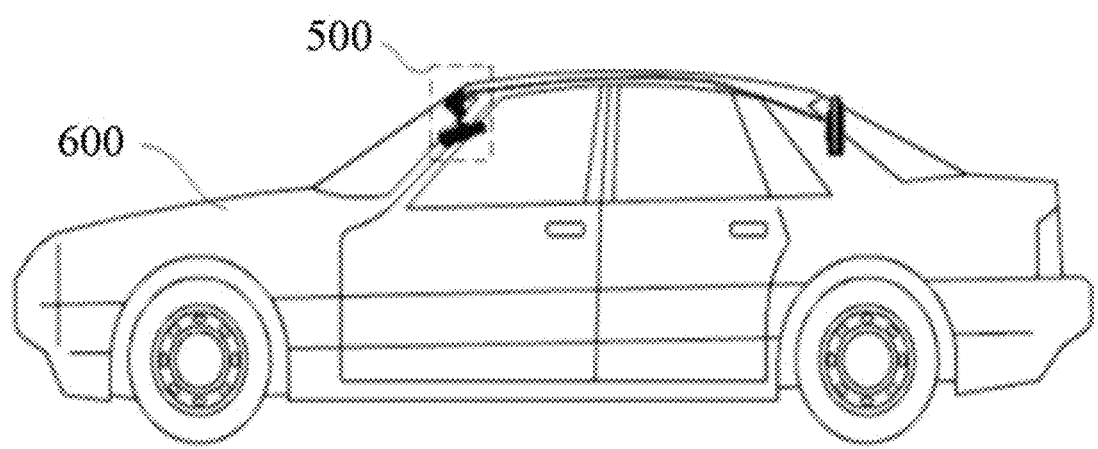
FIG. 14 is a schematic diagram of the vehicle camera according to the sixth embodiment of the disclosure.

FIGS. 13 and 14 illustrates a vehicle camera 500, which includes the camera module 400 as described above, a processor 501, and a memory 502. The camera module 400 is configured to capture images of the surroundings, the processor 501 is configured to process the captured images, and the memory 502 is configured to store the captured images. The processor 501 is communicated with the camera module 400 and the memory 502. That is, the captured images can be transmitted to the processor 501 and stored in the memory 502. The vehicle camera 300 is installed in a car 600, and can be applied to an automatic driving system of the car 600, so that the driverless vehicle system can control the direction and the speed of the car 600 according to the captured images of the surroundings.

The above embodiments only show several implementation forms of the present disclosure, and the description is relatively specific and detailed, but it cannot be understood as a limitation to the scope of the present disclosure. It should be noted that for those of ordinary skill in the art, modifications and improvements can be made without departing from the concept of the present disclosure, and these modifications and improvements all fall within the protection scope of the present disclosure. Therefore, the protection scope of the present disclosure shall be subject to the appended claims.

What is claimed is:

1. A wide-angle lens, from an object side to an image side along an optical axis, sequentially comprising a first lens, a second lens, a third lens, a fourth lens, a stop, a fifth lens, a sixth lens, a seventh lens, and a filter, wherein
the first lens has a negative focal power, an object side surface of the first lens is convex, and an image side surface of the first lens is concave;
the second lens has a negative focal power, an object side surface of the second lens is convex, and the image side surface of the second lens is concave;
the third lens has a negative focal power, and an object side surface and an image side surface of the third lens are both concave;
the fourth lens has a positive focal power, and an object side surface and an image side surface of the fourth lens are both convex;
the fifth lens has a positive focal power, and an object side surface and an image side surface of the fifth lens are both convex;
the sixth lens has a negative focal power, an object side surface and an image side surface of the sixth lens are both concave, and the fifth lens and the sixth lens form a cemented body; and
the seventh lens has a positive focal power, and an object side surface and an image side surface of the seventh lens are both convex;
wherein the first lens and the fourth lens are glass spherical lenses, and each of the second lens, the third lens, the fifth lens, the sixth lens, and the seventh lens is a plastic aspherical lens;
wherein the wide-angle lens meets the expression:

$1.55 < h/f < 1.65;$ where h represents an image height corresponding to half of the maximum field of view of the wide-angle lens, and f represents an effective focal length of the wide-angle lens.

2. The wide-angle lens according to claim 1, wherein the wide-angle lens meets the expression:

$0.04/° < D/h/\text{HFOV} < 0.06/°;$ where HFOV represents half of the maximum field of view of the wide-angle lens, and D represents the maximum diameter of the object side surface of the first lens.

3. The wide-angle lens according to claim 1, wherein the wide-angle lens meets the expression:

$0.06/° < \text{TTL}/h/\text{HFOV} < 0.07/°;$ where TTL represents a total optical length of the wide-angle lens, and HFOV represents half of the maximum field of view of the wide-angle lens.

4. The wide-angle lens according to claim 1, wherein the wide-angle lens meets the expressions:

$15 \times 10^{-6}/(°\text{C}.(\text{ide-an}dN/dT)2+(dN/dT)3]/(f2+f3) < 20 \times 10^{-6}/(°\text{C}.*\text{mm});$ $-70 \times 10^{-6}/(°\text{C}.*\text{mm}) < [(dN/dT)5+(dN/dT)6+(dN/dT)7]/(f5+f6+f7) < -50 \times 10^{-6}/(°\text{C}.*\text{mm});$ where (dN/dT)2 represents a temperature coefficient of refractive index of the second lens at 20° C., (dN/dT)3 represents a temperature coefficient of refractive index of the third lens at 20° C., (dN/dT)5 represents a temperature coefficient of refractive index of the fifth lens at 20° C., (dN/dT)6 represents a temperature coefficient of refractive index of the sixth lens at 20° C., (dN/dT)7 represents a temperature coefficient of refractive index of the seventh lens at 20° C., f2 represents an effective focal length of the second lens, f3 represents an effective focal length of the third lens, f5 represents an effective focal length of the fifth lens, f6 represents an effective focal length of the six lenses, and f7 represents an effective focal length of the seventh lens.

5. The wide-angle lens according to claim 1, wherein the wide-angle lens meets the expression:

$0.4 < (T23+T45)/T10 < 0.45;$ where T23 represents an air spacing between the first lens and the second lens on the optical axis, T45 represents an air spacing between the second lens and the third lens on the optical axis, and T10 represents a distance between the object side surface of the first lens and a surface of the stop.

6. The wide-angle lens according to claim 1, wherein the wide-angle lens meets the following expression:

$0.2 < R31/R72 < 0.65;$ where R31 represents a radius of curvature of the object side surface of the third lens, and R72 represents a radius of curvature of the image side surface of the seventh lens.

7. The wide-angle lens according to claim 1, wherein the wide-angle lens meets the expressions:

$1.9 < D5/E5 < 2.15;$ $0.47 < D6/E6 < 0.52;$ where D5 represents a center thickness of the fifth lens, E5 represents an edge thickness of the fifth lens, D6 represents a center thickness of the sixth lens, and E6 represents an edge thickness of the sixth lens.

8. The wide-angle lens according to claim 1, wherein the wide-angle lens meets the expression:

$-28 < (V1+V2)(\varphi1+\varphi2)+(V3+V4)(\varphi3+\varphi4) < -20;$ where V1 represents a dispersion coefficient of the first lens, V2 represents a dispersion coefficient of the second lens, V3 represents a dispersion coefficient of the third lens, V4 represents a dispersion coefficient of the fourth lens, φ1 represents a focal power of the first lens, φ2 represents a focal power of the second lens, φ3 represents a focal power of the third lens, and φ4 represents a focal power of the fourth lens.

9. The wide-angle lens according to claim 1, wherein the wide-angle lens meets the expression:

$$7<(V5+V6)(\varphi5+\varphi6)+(V7)(\varphi7)<10;$$

where V5 represents a dispersion coefficient of the fifth lens, V6 represents a dispersion coefficient of the sixth lens, V7 represents a dispersion coefficient of the seventh lens, φ5 represents a focal power of the fifth lens, and φ6 represents a focal power of the sixth lens, and φ7 represents a focal power of the seventh lens.

10. The wide-angle lens according to claim 1, wherein the wide-angle lens meets the expression:

$$0.5<\Sigma CT/TTL<0.6;$$

where ΣCT represents a sum of thicknesses of the first lens to the seventh lens on the optical axis, and TTL represents a total optical length of the wide-angle lens.

11. A camera module, comprising a barrel, a holder, an image sensor, and a wide-angle lens, wherein the wide-angle lens is mounted in the barrel, the image sensor is mounted in the holder, the barrel is movably mounted on the holder, the wide-angle lens is configured to form an optical image, the image sensor is configured to generate image data for the optical image sensed thereby, and the wide-angle lens, from an object side to an image side along an optical axis, sequentially comprises a first lens, a second lens, a third lens, a fourth lens, a stop, a fifth lens, a sixth lens, a seventh lens, and a filter, wherein
- the first lens has a negative focal power, an object side surface of the first lens is convex, and an image side surface of the first lens is concave;
- the second lens has a negative focal power, an object side surface of the second lens is convex, and the image side surface of the second lens is concave;
- the third lens has a negative focal power, and an object side surface and an image side surface of the third lens are both concave;
- the fourth lens has a positive focal power, and an object side surface and an image side surface of the fourth lens are both convex;
- the fifth lens has a positive focal power, and an object side surface and an image side surface of the fifth lens are both convex;
- the sixth lens has a negative focal power, an object side surface and an image side surface of the sixth lens are both concave, and the fifth lens and the sixth lens form a cemented body;
- the seventh lens has a positive focal power, and an object side surface and an image side surface of the seventh lens are both convex; and
- the first lens and the fourth lens are glass spherical lenses, each of the second lens, the third lens, the fifth lens, the sixth lens, and the seventh lens is a plastic aspherical lens;

wherein the wide-angle lens meets the expression:

$$1.55<h/f<1.65;$$

where h represents an image height corresponding to half of the maximum field of view of the wide-angle lens, and f represents an effective focal length of the wide-angle lens.

12. The camera module according to claim 11, wherein the wide-angle lens meets the expression:

$$0.04/°<D/h/\text{HFOV}<0.06/°;$$

where HFOV represents half of the maximum field of view of the wide-angle lens, and D represents the maximum diameter of the object side surface of the first lens.

13. The camera module according to claim 11, wherein the wide-angle lens meets the expression:

$$0.06/°<TTL/h/\text{HFOV}<0.07/°;$$

where TTL represents a total optical length of the wide-angle lens, and HFOV represents half of the maximum field of view of the wide-angle lens.

14. The camera module according to claim 11, wherein the wide-angle lens meets the expressions:

$$15\times10^{-6}/(°\text{C.(herein}dN/dT)2+(dN/dT)3]/(f2+f3)<20\times10^{-6}/(°\text{C.*mm});$$

$$-70\times10^{-6}/(°\text{C.*mm})<[(dN/dT)5+(dN/dT)6+(dN/dT)7]/(f5+f6+f7)<-50\times10^{-6}/(°\text{C.*mm});$$

where (dN/dT)2 represents a temperature coefficient of refractive index of the second lens at 20° C., (dN/dT)3 represents a temperature coefficient of refractive index of the third lens at 20° C., (dN/dT)5 represents a temperature coefficient of refractive index of the fifth lens at 20° C., (dN/dT)6 represents a temperature coefficient of refractive index of the sixth lens at 20° C., (dN/dT)7 represents a temperature coefficient of refractive index of the seventh lens at 20° C., f2 represents an effective focal length of the second lens, f3 represents an effective focal length of the third lens, f5 represents an effective focal length of the fifth lens, f6 represents an effective focal length of the six lenses, and f7 represents an effective focal length of the seventh lens.

15. The camera module according to claim 11, wherein the wide-angle lens meets the expression:

$$0.4<(T23+T45)/T10<0.45;$$

where T23 represents an air spacing between the first lens and the second lens on the optical axis, T45 represents an air spacing between the second lens and the third lens on the optical axis, and T10 represents a distance between the object side surface of the first lens and a surface of the stop.

16. The camera module according to claim 11, wherein the wide-angle lens meets the following expression:

$$0.2<R31/R72<0.65;$$

where R31 represents a radius of curvature of the object side surface of the third lens, and R72 represents a radius of curvature of the image side surface of the seventh lens.

17. The camera module according to claim 11, wherein the wide-angle lens meets the expressions:

$$1.9<D5/E5<2.15;$$

$$0.47<D6/E6<0.52;$$

where D5 represents a center thickness of the fifth lens, E5 represents an edge thickness of the fifth lens, D6 represents a center thickness of the sixth lens, and E6 represents an edge thickness of the sixth lens.

18. A vehicle camera, comprising a camera module, a processor, and a memory, wherein the camera module is configured to capture one or more images, the processor is configured to process the captured images, and the memory is configured to store the images; the camera module comprises a wide-angle lens and an image sensor opposite to the wide-angle lens, the wide-angle lens sequentially comprises a first lens, a second lens, a third lens, a fourth lens, a stop, a fifth lens, a sixth lens, a seventh lens, and a filter, wherein the first lens has a negative focal power, an object side surface of the first lens is convex, and an image side surface of the first lens is concave;

the second lens has a negative focal power, an object side surface of the second lens is convex, and the image side surface of the second lens is concave;

the third lens has a negative focal power, and an object side surface and an image side surface of the third lens are both concave;

the fourth lens has a positive focal power, and an object side surface and an image side surface of the fourth lens are both convex;

the fifth lens has a positive focal power, and an object side surface and an image side surface of the fifth lens are both convex;

the sixth lens has a negative focal power, an object side surface and an image side surface of the sixth lens are both concave, and the fifth lens and the sixth lens form a cemented body;

the seventh lens has a positive focal power, and an object side surface and an image side surface of the seventh lens are both convex; and the first lens and the fourth lens are glass spherical lenses, each of the second lens, the third lens, the fifth lens, the sixth lens, and the seventh lens is a plastic aspherical lens;

wherein the wide-angle lens meets the expression:

$1.55 < h/f < 1.65;$ where h represents an image height corresponding to half of the maximum field of view of the wide-angle lens, and f represents an effective focal length of the wide-angle lens.

* * * * *